Figure 1:
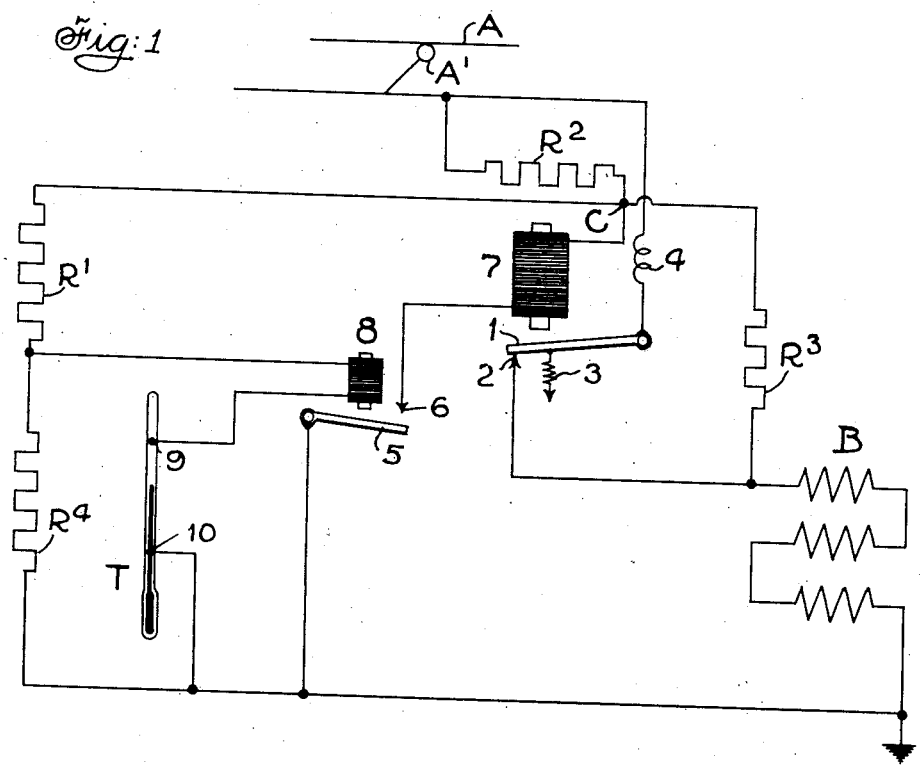

L. P. HYNES.
HEATER SYSTEM.
APPLICATION FILED JUNE 14, 1918.

1,303,323.

Patented May 13, 1919.

Lee P. Hynes, Inventor
By his Attorneys

UNITED STATES PATENT OFFICE.

LEE P. HYNES, OF ALBANY, NEW YORK, ASSIGNOR TO CONSOLIDATED CAR-HEATING COMPANY, OF ALBANY, NEW YORK, A CORPORATION OF WEST VIRGINIA.

HEATER SYSTEM.

1,303,323.   Specification of Letters Patent.   Patented May 13, 1919.

Application filed June 14, 1918. Serial No. 239,936.

*To all whom it may concern:*

Be it known that I, LEE P. HYNES, a citizen of the United States, and a resident of the city of Albany, county of Albany, and State of New York, have invented an Improvement in Heater Systems, of which the following is a specification.

My present invention relates to heating apparatus which is electrically regulated, and has particular reference to that class of such apparatus which is controlled by a thermostat so that the heat is turned on and off at determinate temperatures. It has particular reference to car-heating apparatus, and is especially applicable to those forms of apparatus in which the heat is furnished by the electric current, although it is not confined in its operation to such devices.

In my prior pending application, Serial No. 235,769, filed May 21, 1918, I have shown apparatus of the class described in this case, which embraces what I believe to be a substantial improvement in that the contacts controlling the supply of current to the heaters are held normally closed by a spring and at desired times are opened by means of an electro-magnet coil, in which sense I use the term "normally closed" in this case. In the case referred to, I have shown means for reducing the current in this electro-magnetic switch as soon as the armature is attracted, so as to prevent undue consumption of current in the controlling devices and also to simplify and cheapen the design, since a smaller and less costly coil is required where the large operating current only flows through it momentarily, and the armature is held in its attracted position by a smaller current thereafter. In the present application I use somewhat similar circuits; but I so arrange the controlling circuit operated by the thermostat that at the time of opening the main switch and reducing the current in the operating coil of the latter, I also reduce the current in the circuit of the thermostat and the relay coöperating therewith which I employ, so as to obtain substantially reduced current flow in the thermostat circuit, thus obtaining the economy of current referred to and also providing an easy rupture of the circuit when the thermostat opens, since the voltage and current through the latter are greatly reduced. This is an important advantage in such apparatus, since obviously the smaller the current to be broken by the thermostat, which is usually a mercury thermometer of well known type, the more certain the operation of the latter will be and the less liable to accident. All of this is accomplished without the use of any additional or auxiliary contacts whatever, the only contacts in the apparatus being the single contact at the main switch, the single contact at the relay, and the single contact in the tube of the thermostat.

The accompanying drawings show diagrammatic representations of apparatus embodying my invention.

Figure 2:
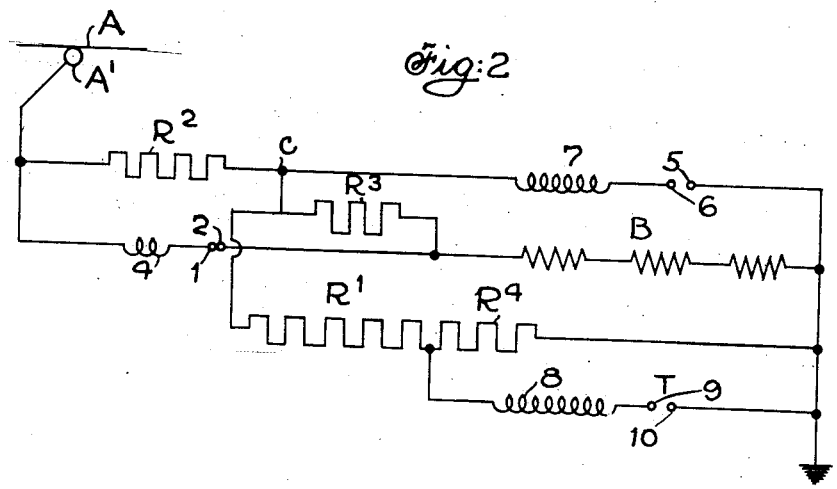

Figure 1 illustrates the circuits with the magnet coils and thermostat commonly employed, and Fig. 2 being a diagram of the circuits with a different resistance arrangement.

In Fig. 1, A is the trolley wire and $A^1$ the trolley of an electrically operated car. B shows diagrammatically the coils of the current-actuated heating devices; though the operation of my improved controlling mechanism is not necessarily restricted to electrical heaters, nevertheless, it finds its most useful application with such devices. 1, 2 are the contacts of the main electro-magnetic switch, which are held together by the spring 3. A circuit passes from the trolley through the blow-out magnet coil 4, which is located in position to extinguish the arc caused by opening the contacts 1, 2; there is no other impedance in the circuit of the heaters, the current passing from the contacts 1, 2 directly through the heaters to ground, so long as the spring 3 holds the contacts together.

In shunt to this circuit is a circuit containing a resistance $R^2$; and from a common connection at C a circuit leads to ground through the coil 7 of the electro-magnetic main switch and across the contacts 5, 6 of the relay, when these contacts are brought together. It will be observed that the resistance $R^2$ is in series in this circuit and serves to limit the current flowing through it. Connected in multiple to the common connection C is a second resistance $R^3$ which receives current from the heater circuit direct, the two resistances $R^2$ and $R^3$ being thus connected in multiple from the trolley to the common connection C, and so long as the contacts 1, 2 are closed both feed current thereto, and thence upon occasion through the coil 7 of the main switch.

Passing from the common connection C is a lead to the resistances R¹ and R⁴, and current flows from the trolley through the resistances R² and R³, thence through the resistances R¹ and R⁴ in series directly to ground. In the illustrated embodiment of the invention there is a constant small flow of current in this latter circuit. In multiple with the resistance R⁴ is the thermostat T, of known type, the mercury in which forms one terminal 10 and a contact 9 sealed through the glass in the ordinary way forms the other terminal of the circuit of a relay magnet 8; it will be obvious that the voltage in this relay circuit will depend upon the characteristics of the resistance R⁴, in shunt thereto. Only approximate figures may be given for the ohmic resistance of the different parts indicated in the drawing, since of course this will depend upon the voltage and to some extent upon the character of the current employed. For standard 600-volt continuous current systems, such as are commonly operated in cities and on suburban routes, I have used for the resistances R¹, R² and R³ 2,000 ohms, for the resistance R⁴ about 600 ohms; for the coil of the electromagnet 7 about 2,000 ohms and for the coil of the relay 8 about 800 ohms.

The operation of the parts just described is as follows: Normally when the thermostat contacts 9 and 10 are open the relay contacts 5, 6 will also be open and the main switch contacts 1, 2 will be closed, sending current directly through the heaters B and a small current also through the resistances R¹ and R⁴ to ground, current also passing from the heater circuit through the resistance R³ in multiple with R² to the common connection C. When the temperature rises and the mercury in the thermostat touches the contact 9, the coil 8 of the relay is energized at whatever potential is determined by the drop across the resistance R⁴, which of course may be designed to obtain the desired result. Coil 8 picks up the armature 5 and closes the contacts 5, 6. This sends current through the coil 7 of the main switch, which at the moment of closing of the relay contacts is a large current, due to the relatively low resistance of the main switch coil 7 and to the small impedance afforded by the resistances R², R³ when connected in multiple. Thereupon the contacts 1, 2 of the heater circuit are opened, and no substantial current flows in that circuit, inasmuch as it is now fed only through the resistances R², R³ in series. The opening of the switch contacts 1, 2, however, immediately cuts down the current in the coil 7, inasmuch as the resistance R³ is now cut out of the series-multiple circuit with that coil, and only the resistance R² is left in series with it; some current continues also to flow through the resistance R³, which is in shunt to the coil 7. These two circuits just described, that is, the heater circuit and the main-switch coil circuit, are in shunt to the relay circuit containing the resistance R¹, the relay magnet coil 8, and the thermostat and its shunting resistance R⁴; the resistance of the relay circuit is considerably greater than that of the circuit containing coil 7, and therefore there is at once a substantial drop in the current in the thermostat and relay circuit. This reduction in current and voltage in both of the coils is entirely permissible, because it takes substantially less current to hold the armatures in contact with the cores than it does to lift them.

Fig. 2 shows substantially the same circuits, but in that figure I have shown the resistances R¹, R⁴ in a single resistance divided into two parts by a tap passing to the relay magnet coil 8. This is an equivalent form for the two separate resistances R¹, R⁴ of Fig. 1.

It will be seen that there are no additional auxiliary automatic devices or contacts of any kind in the apparatus, as has been proposed heretofore in obtaining reduction of current in circuits. The apparatus is thus rendered more certain in its results and less complicated and easier to keep in order.

In some of the claims I have used the expression "at desired times". By this I do not mean to imply that the switch is in any sense a time switch or that the apparatus works periodically, but that it functions at the time when certain conditions arise. The expression is often used in electrical cases to imply "upon the occurrence of this condition", for example, and it is in that sense I use it in this case.

Many changes may be made in the arrangements which I have indicated without departing from the invention and these I aim to cover by the claims.

I claim as my invention:

1. In an electrically controlled heating system, a source of supply, heaters, and a normally closed connection from the heaters to the source of supply; in combination with an electro-magnetic switch for interrupting the connection at desired times, a thermostat, means controlled by the thermostat for actuating the switch, and means for reducing the current in the switch and in the thermostate when the latter closes its contacts.

2. In a heating system, a source of supply, heaters, and a normally closed connection between them; in combination with an electrically operated switch for opening the connection, a relay controlling the switch, a thermostat controlling the relay, and means, brought into action by the closing of the relay contact, for reducing the current in both the switch circuit and the thermostatic circuit.

3. In an electrically operated heating system, a source of current, heaters, and a normally closed connection between them; in combination with an electro-magnetic main switch for opening the connection, a single-contact relay controlling the main switch, a thermostat in series with and controlling the relay winding, and means for reducing the current flow in both the main switch circuit and thermostatic relay circuit when the relay contact closes.

4. In an electrically operated heating system, a source of current, heaters, and a normally closed main switch in the connection between the source of current and the heaters, a relay controlling the main switch, and a thermostat controlling the relay; in combination with resistances connected in multiple to the main switch circuit when the contacts of the main switch are closed, one of the resistances being in series and one in shunt with the main switch circuit when the contacts of the main switch are opened.

5. In an electrically operated heating system, a source of current, heaters, a circuit connecting them, and a main switch in the circuit held normally closed by a spring and opened by an electro-magnet; a pair of resistances connected between the source of current and the winding of the electro-magnet, and a relay and thermostat for actuating the electro-magnet at desired times; the resistances being connected in multiple series to the main-switch winding when the main switch is closed, and one of them being in series and the other in shunt with the main switch circuit when the contacts of the main switch are open.

6. In an electrically operated heating system, a source of current, heaters and a circuit connecting them, a main switch having contacts normally closed by a spring and opened at desired times by an electro-magnet, a relay controlling the circuit of the electro-magnet, and a thermostat controlling the circuit of the relay; in combination with a plurality of resistances connected in multiple with each other and in series to the main-switch circuit when the contacts of the main switch are closed, a part of such resistances being connected in series to the main-switch circuit and a part in multiple therewith when the contacts of the main switch are opened; whereby, when the relay magnet closes the circuit of the main switch, the latter opens the circuit of the heaters, and the current flow through the main-switch circuit and the thermostat circuit is reduced.

In testimony whereof, I have signed by name to this specification this 31st day of May, 1918.

LEE P. HYNES.